US010833559B2

(12) United States Patent
Ge et al.

(10) Patent No.: US 10,833,559 B2
(45) Date of Patent: Nov. 10, 2020

(54) UNIDIRECTIONAL ROTATING MOTOR

(71) Applicant: ZHEJIANG LINIX MOTOR CO., LTD, Dongyang (CN)

(72) Inventors: Jianliang Ge, Dongyang (CN); Haojie Jiang, Dongyang (CN)

(73) Assignee: ZHEJIANG LINIX MOTOR CO., LTD., Dongyang (CN)

( * ) Notice: Subject to any disclaimer, the term of this patent is extended or adjusted under 35 U.S.C. 154(b) by 159 days.

(21) Appl. No.: 16/147,860

(22) Filed: Sep. 30, 2018

(65) Prior Publication Data

US 2019/0157943 A1    May 23, 2019

(30) Foreign Application Priority Data

Nov. 23, 2017  (CN) .......................... 2017 1 1179293

(51) Int. Cl.
*H02K 7/08* (2006.01)
*F16C 17/10* (2006.01)
(Continued)

(52) U.S. Cl.
CPC .............. *H02K 7/08* (2013.01); *F16C 17/10* (2013.01); *H02K 5/04* (2013.01); *H02K 7/003* (2013.01);
(Continued)

(58) Field of Classification Search
CPC ............ H02K 7/08; H02K 5/04; H02K 7/003; H02K 7/083; H02K 7/102; F16C 17/10; F16C 19/55; F16C 41/001
(Continued)

(56) References Cited

U.S. PATENT DOCUMENTS 4,720,647 A *  1/1988  Plumer ................ H02K 7/1028
                                                           310/77
2006/0219494 A1* 10/2006 Moon .................... F16D 41/07
                                                            188/82.1
(Continued)

*Primary Examiner* — Forrest M Phillips
(74) *Attorney, Agent, or Firm* — Jiwen Chen; Jacobson Holman PLLC

(57) ABSTRACT

An object of the present invention is to provide a unidirectional rotating motor, which can avoid reverse rotation of the motor due to heavy loads. The present invention employs the following technical solution. A unidirectional rotating motor is provided, comprising an output shaft; one end of the output shaft is, as an output end, extended to an outer side of the motor, and the other end of the output shaft is, as a fitting end, provided with a unidirectional bearing; an inner ring of the unidirectional bearing is linked to the fitting end of the output shaft and an outer ring of the unidirectional bearing is fitted with a first bushing and a second bushing; the first bushing consists of a first bushing segment I and a first bushing segment II, and the first bushing segment I has an inner diameter greater than that of the first bushing segment II; the second bushing at least consists of a second bushing segment I and a second bushing segment II, and the second bushing segment I has an inner diameter greater than that of the second bushing segment II; the first bushing and the second bushing are detachably fixed; and an outer bearing is fixed on an outer side of the second bushing, and an inner ring of the outer bearing is fixed to the second bushing.

1 Claim, 1 Drawing Sheet

(51) Int. Cl.
  *H02K 7/102* (2006.01)
  *H02K 7/00* (2006.01)
  *H02K 5/04* (2006.01)
  *F16C 41/00* (2006.01)
  *F16C 19/55* (2006.01)

(52) U.S. Cl.
  CPC ............ *H02K 7/083* (2013.01); *H02K 7/102* (2013.01); *F16C 19/55* (2013.01); *F16C 41/001* (2013.01)

(58) Field of Classification Search
  USPC .......................................................... 310/77
  See application file for complete search history.

(56) References Cited

U.S. PATENT DOCUMENTS

| | | | |
|---|---|---|---|
| 2006/0219510 A1* | 10/2006 | Chung | F16D 41/064 192/45.004 |
| 2014/0300229 A1* | 10/2014 | Imai | H02K 7/1023 310/77 |
| 2016/0107720 A1* | 4/2016 | Xu | B62M 11/145 475/4 |
| 2020/0130776 A1* | 4/2020 | Luo | B62M 1/28 |

\* cited by examiner

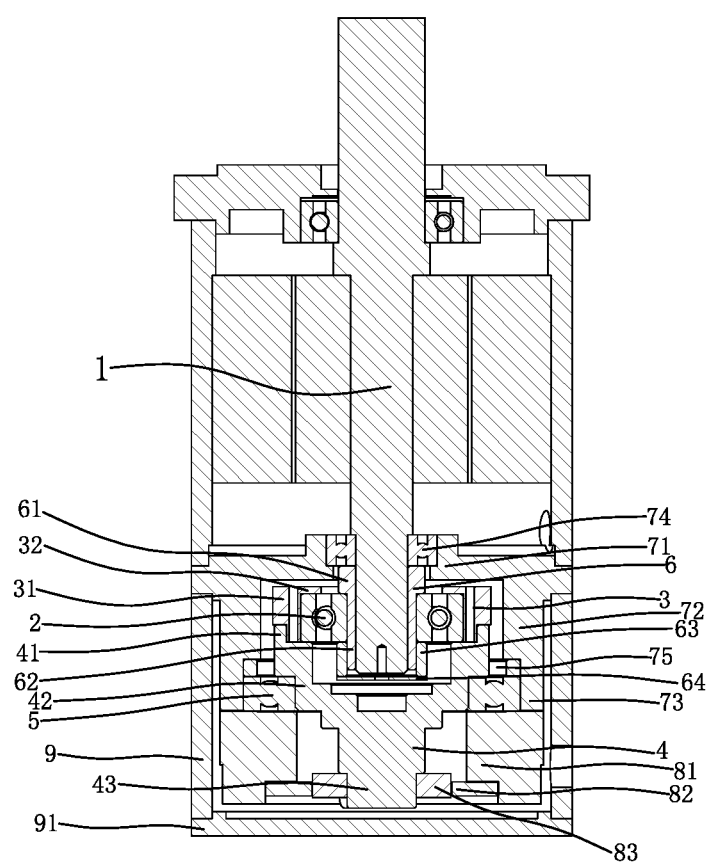

UNIDIRECTIONAL ROTATING MOTOR

This application claims the priority benefit of Chinese Application No. 201711179293.4, filed Nov. 23, 2017 in Chinese, which is hereby incorporated by reference.

TECHNICAL FIELD OF THE INVENTION

The present invention relates to a unidirectional rotating motor.

BACKGROUND OF THE INVENTION

In the fishery industry, fishing boats are almost equipped with a motor to haul in the net or the light strip. When catching seafood such as squid, the seafood on the net or the light strip needs to be preliminarily processed as the net or the light strip is hauled in, for example, operations such as removal of water. For this purpose, it is necessary to stop the rotation of the motor. However, due to the heavy seafood on the net or the light strip, the motor may rotate reversely. As a result, the seafood on the net or the light strip may fall into the sea again, and also fishing lines on the boats may be tangled up.

SUMMARY OF THE INVENTION

An object of the present invention is to provide a unidirectional rotating motor, which can avoid reverse rotation of the motor due to heavy loads.

For this purpose, the present invention employs the following technical solution. A unidirectional rotating motor is provided, comprising an output shaft; one end of the output shaft is, as an output end, extended to an outer side of the motor, and the other end of the output shaft is, as a fitting end, provided with a unidirectional bearing; an inner ring of the unidirectional bearing is linked to the fitting end of the output shaft and an outer ring of the unidirectional bearing is fitted with a first bushing and a second bushing; the first bushing consists of a first bushing segment I and a first bushing segment II, and the first bushing segment I has an inner diameter greater than that of the first bushing segment II; the second bushing at least consists of a second bushing segment I and a second bushing segment II, and the second bushing segment I has an inner diameter greater than that of the second bushing segment II; the first bushing and the second bushing are detachably fixed; the first bushing and the second bushing are fitted with the unidirectional bearing, so that the first bushing segment I and the second bushing segment I are located on an outer side of the outer ring of the unidirectional bearing and the outer ring of the unidirectional bearing is limited between the first bushing segment II and the second bushing segment II; and an outer bearing is fixed on an outer side of the second bushing, and an inner ring of the outer bearing is fixed to the second bushing.

Since a unidirectional bearing is provided on the output shaft in the present invention, it is less possible for the output shaft to rotate reversely due to heavy loads. This facilitates the preliminary processing of seafood, for example, operations such as removal of water from squid. The outer bearing is used for supporting the unidirectional bearing. The first bushing and the second bushing are used for limiting the outer ring of the unidirectional bearing. By fixing the first bearing and the second bearing, the axial compression and limitation of the unidirectional bearing is realized. The circumferential outer wall of the outer ring of the unidirectional bearing is not to be fixed to the first bearing or the second bearing, so the assembly and fixation of the unidirectional bearing is more convenient.

Preferably, a third bushing is sheathed on the fitting end of the output shaft; the third bushing consists of a third bushing segment I and a third bushing segment II, and the third bushing segment I has an outer diameter greater than that of the third bushing segment II; the unidirectional bearing is sheathed on the third bushing segment II, and a fourth bushing is also sheathed on the third bushing segment II; a pressing plate is provided on a side, which is away from the output end, of the output shaft; an axial face of the fitting end of the output shaft is recessed inward to form a fitting hole into which a first fastener is fitted; the pressing plate is fixed to the output shaft via the first fastener; and the pressing plate is resisted against an axial face of the fourth bushing, and the inner ring of the unidirectional bearing is limited between the third bushing segment I and the fourth bushing.

Since the unidirectional bearing is not directly fixed on the output shaft, the service life of the unidirectional bearing is longer. Meanwhile, a unidirectional bearing with a greater inner diameter may be used so that the unidirectional bearing can bear a higher torque. Therefore, the motor of the present invention can bear heavier loads. The arrangement of the third bushing segment I, the fourth bushing and the pressing plate is convenient for the fixation of the inner ring of the unidirectional bearing.

Preferably, a circumferential outer wall of an end, which is away from the second bushing segment I, of the second bushing segment II is recessed inward to form a circular groove into which the inner ring of the outer bearing is fitted and fixed. Such an arrangement facilitates the assembly of the outer bearing.

Preferably, the third bushing is closely fitted with and fixed to the output shaft, and connected to the output shaft by a key.

Preferably, a rear end cover of the motor consists of a rear end cover body, a rear end cover segment I and a rear end cover segment II; a bearing chamber is formed on the rear end cover body, and a fixation bearing for fixing the output shaft is fixed on the rear end cover body; both the rear end cover segment I and the rear end cover segment II are circular, and both the rear end cover segment I and the rear end cover segment II are arranged coaxially to the output shaft; the rear end cover segment II has an inner diameter less than that of the rear end cover segment I; a brake is provided on a side of the rear end cover, and the brake comprises a brake body, a brake pad and a brake block; and the brake is fixed to the rear end cover, so that the brake body comes into contact with the axial face on a side of the outer ring of the outer bearing and the outer ring of the outer bearing is limited between the rear end cover segment II and the brake body.

It is unnecessary to change the structure of the parts outside the rear end cover of the motor, and an existing motor may be used. Furthermore, the rear end cover is highly coaxial to the output shaft, and this can improve the coaxiality of the outer bearing, the inner bearing and the output shaft.

Since the net, the light strip and the seafood are heavy, the output shaft may tilt. In the present invention, the circumferential outer wall of the outer ring of the outer bearing is not fixed to the rear end cover and the outer bearing is limited between the rear end cover segment II and the brake body, the outer bearing can displace radially so that the circumferential outer wall of the outer ring of the outer bearing comes into contact with the end cover, in order to adjust the position of the outer bearing. In this way, the unidirectional bearing and the output shaft can be corrected and the noise of the motor can be reduced. This is helpful for the operation of the motor.

Preferably, a gasket is provided between the outer ring of the outer bearing and the rear end cover segment II, and the outer ring of the outer bearing is limited between the gasket and the brake body. Such an arrangement facilitates the fixation of the outer bearing.

Preferably, the brake body is fixed to the rear end cover; the brake body has a circular groove into which the brake pad is fitted; the brake pad has a positioning groove in which the brake block is located; the second bushing further comprises a second bushing segment III, the second bushing segment II is located between the second bushing segment I and the second bushing segment III, and the second bushing segment III is fixed to the brake pad; and the output shaft is rotated to drive the brake block and the brake pad to rotate. To be convenient for the linkage of the brake block and the brake pad, both the outer edge of the brake block and the outer edge of the positioning groove may be square or polygonal. During the braking, the brake body receives a signal to stop the rotation of the brake pad. Since the brake pad is linked to the brake block, the brake block also stops rotating, and the output shaft is stopped rotating.

Preferably, the second bushing segment III has an outer diameter less than that of the second bushing segment II, the brake block is sheathed on the second bushing segment III, and the second bushing segment III is closely fitted with the brake block and connected with the brake block by a key.

Preferably, limiting slots, which are fitted with each other, are formed on the first bushing segment I and the second bushing segment I, and the first bushing is fixed to the second bushing via a second fastener.

Preferably, both an outer edge of the rear end cover segment I and an outer edge of the rear end cover segment II are on an inner side of an outer edge of the rear end cover body; a shield, which is a cylinder with two open ends, is provided on each of an outer side of the rear end cover segment I and an outer side of the rear end cover segment II; limiting slots, which are fitted with each other, are formed on one end of the shield and the rear end cover body, and a closure plate is fixed at the other end of the shield; and sealant is coated on a contact surface of the closure plate with the shield.

The unidirectional rotating motor of the present invention can avoid reverse rotation of the motor due to heavy loads. Furthermore, the load bearing capacity of the motor of the present invention is greatly increased. The motor of the present invention is simple in structure, and can be manufactured and assembly conveniently.

BRIEF DESCRIPTION OF THE DRAWINGS

FIG. 1 is a structural diagram of the present invention.

DETAILED DESCRIPTION OF THE INVENTION

The present invention will be further described below by specific embodiments with reference to accompanying drawings.

As shown in FIG. 1, a unidirectional rotating motor is provided, comprising an output shaft 1; one end of the output shaft 1 is, as an output end, extended to an outer side of the motor, and the other end of the output shaft 1 is, as a fitting end, provided with a unidirectional bearing 2; an inner ring of the unidirectional bearing 2 is linked to the fitting end of the output shaft 1 and an outer ring of the unidirectional bearing 2 is fitted with a first bushing 3 and a second bushing 4; the first bushing 3 consists of a first bushing segment I 31 and a first bushing segment II 32, and the first bushing segment I 31 has an inner diameter greater than that of the first bushing segment II 32; the second bushing 4 at least consists of a second bushing segment I 41 and a second bushing segment II 42, and the second bushing segment I 41 has an inner diameter greater than that of the second bushing segment II 42; the first bushing 3 and the second bushing 4 are detachably fixed; the first bushing 3 and the second bushing 4 are fitted with the unidirectional bearing 2, so that the first bushing segment I 31 and the second bushing segment I 41 are located on an outer side of the outer ring of the unidirectional bearing 2 and the outer ring of the unidirectional bearing 2 is limited between the first bushing segment II 32 and the second bushing segment II 42; and an outer bearing 5 is fixed on an outer side of the second bushing 4, and an inner ring of the outer bearing 5 is fixed to the second bushing 4.

A third bushing 6 is sheathed on the fitting end of the output shaft 1; the third bushing 6 consists of a third bushing segment I 61 and a third bushing segment II 62, and the third bushing segment I 61 has an outer diameter greater than that of the third bushing segment II 62; the unidirectional bearing 2 is sheathed on the third bushing segment II 62, and a fourth bushing 63 is also sheathed on the third bushing segment II 62; a pressing plate 64 is provided on a side, which is away from the output end, of the output shaft 1; an axial face of the fitting end of the output shaft 1 is recessed inward to form a fitting hole into which a first fastener is fitted; the pressing plate 64 is fixed to the output shaft 1 via the first fastener; and the pressing plate 64 is resisted against an axial face of the fourth bushing 63, and the inner ring of the unidirectional bearing 2 is limited between the third bushing segment I 61 and the fourth bushing 63. The third bushing 6 is closely fitted with and fixed to the output shaft 1, and connected to the output shaft 1 by a key. A circumferential outer wall of an end, which is away from the second bushing segment I 41, of the second bushing segment II 42 is recessed inward to form a circular groove into which the inner ring of the outer bearing 5 is fitted and fixed. Limiting slots, which are fitted with each other, are formed on the first bushing segment I 31 and the second bushing segment I 41, and the first bushing 3 is fixed to the second bushing 4 via a second fastener.

A rear end cover of the motor consists of a rear end cover body 71, a rear end cover segment I 72 and a rear end cover segment II 73, and the rear end cover segment I 72 is located between the rear end cover segment II 73 and the rear end cover body 71; a bearing chamber is formed on the rear end cover body 71, and a fixation bearing 74 for fixing the output shaft 1 is fixed on the rear end cover body 71; both the rear end cover segment I 72 and the rear end cover segment II 73 are circular, and both the rear end cover segment I 72 and the rear end cover segment II 73 are arranged coaxially to the output shaft 1; the rear end cover segment II 73 has an inner diameter less than that of the rear end cover segment I 72. A brake is provided on a rear side of the rear end cover segment II 73, and the brake comprises a brake body 81, a brake pad 82 and a brake block 83; and the brake is fixed to the rear end cover segment II 73, so that the brake body 81 comes into contact with the axial face on a side of the outer ring of the outer bearing 5 and the outer ring of the outer bearing 5 is limited between the rear end cover segment II 73 and the brake body 81. A circular gasket 75 is provided between the outer ring of the outer bearing 5 and the rear end cover segment II 73, and the outer ring of the outer bearing 5 is limited between the gasket 75 and the brake body 81.

The brake body 81 is fixed to the rear end cover via a fastener; the brake body 81 has a circular groove into which the brake pad 82 is fitted; the brake pad 82 has a positioning groove in which the brake block 83 is located; the second bushing 4 further comprises a second bushing segment III 43, the second bushing segment II 42 is located between the second bushing segment I 41 and the second bushing segment III 43, and the second bushing segment III 43 is fixed to the brake pad 83; and the output shaft 1 is rotated to drive the brake block 83 and the brake pad 82 to rotate. The second bushing segment III 43 has an outer diameter less than that of the second bushing segment II 42 so that the motor of the present invention is more compact, the brake block 83 is sheathed on the second bushing segment III 43, and the second bushing segment III 43 is closely fitted with the brake block 83 and connected with the brake block 83 by a key.

Both an outer edge of the rear end cover segment I 72 and an outer edge of the rear end cover segment II 73 are on an inner side of an outer edge of the rear end cover body 71; a shield 9, which is a cylinder with two open ends, is provided on each of an outer side of the rear end cover segment I 72 and an outer side of the rear end cover segment II 73; limiting slots, which are fitted with each other, are formed on one end of the shield 9 and the rear end cover body 71, and a closure plate 91 is fixed at the other end of the shield 9; and sealant is coated on a contact surface of the closure plate 91 with the shield 9.

Since a unidirectional bearing is provided on the output shaft in the present invention, it is less possible for the output shaft to rotate reversely due to heavy loads. This facilitates the preliminary processing of seafood, for example, operations such as removal of water from squid. The unidirectional rotating motor of the present invention can avoid reverse rotation of the motor due to heavy loads. Furthermore, the load bearing capacity of the motor of the present invention is greatly increased. The motor of the present invention is simple in structure, and can be manufactured and assembly conveniently.

The invention claimed is:

1. A unidirectional rotating motor, comprising an output shaft; one end of the output shaft is, as an output end, extended to an outer side of the motor, and the other end of the output shaft is, as a fitting end, provided with a unidirectional bearing; an inner ring of the unidirectional bearing is linked to the fitting end of the output shaft and an outer ring of the unidirectional bearing is fitted with a first bushing and a second bushing; the first bushing consists of a first bushing segment I and a first bushing segment II, and the first bushing segment I has an inner diameter greater than that of the first bushing segment II; the second bushing at least consists of a second bushing segment I and a second bushing segment II, and the second bushing segment I has an inner diameter greater than that of the second bushing segment II; the first bushing and the second bushing are detachably fixed; the first bushing and the second bushing are fitted with the unidirectional bearing, so that the first bushing segment I and the second bushing segment I are located on an outer side of the outer ring of the unidirectional bearing and the outer ring of the unidirectional bearing is limited between the first bushing segment II and the second bushing segment II; and an outer bearing is fixed on an outer side of the second bushing, and an inner ring of the outer bearing is fixed to the second bushing;

wherein a third bushing is sheathed on the fitting end of the output shaft; the third bushing consists of a third bushing segment I and a third bushing segment II, and the third bushing segment I has an outer diameter greater than that of the third bushing segment II; the unidirectional bearing is sheathed on the third bushing segment II, and a fourth bushing is also sheathed on the third bushing segment II; a pressing plate is provided on a side, which is away from the output end, of the output shaft; an axial face of the fitting end of the output shaft is recessed inward to form a fitting hole into which a first fastener is fitted; the pressing plate is fixed to the output shaft via the first fastener; and the pressing plate is resisted against an axial face of the fourth bushing, and the inner ring of the unidirectional bearing is limited between the third bushing segment I and the fourth bushing;

wherein a circumferential outer wall of an end, which is away from the second bushing segment I, of the second bushing segment II is recessed inward to form a circular groove into which the inner ring of the outer bearing is fitted and fixed;

wherein the third bushing is closely fitted with and fixed to the output shaft, and connected to the output shaft by a key;

wherein a rear end cover of the motor consists of a rear end cover body, a rear end cover segment I and a rear end cover segment II; a bearing chamber is formed on the rear end cover body, and a fixation bearing for fixing the output shaft is fixed on the rear end cover body; both the rear end cover segment I and the rear end cover segment II are circular, and both the rear end cover segment I and the rear end cover segment II are arranged coaxially to the output shaft; the rear end cover segment II has an inner diameter less than that of the rear end cover segment I; a brake is provided on a side of the rear end cover, and the brake comprises a brake body, a brake pad and a brake block; and the brake is fixed to the rear end cover, so that the brake body comes into contact with the axial face on a side of the outer ring of the outer bearing and the outer ring of the outer bearing is limited between the rear end cover segment II and the brake body;

wherein a gasket is provided between the outer ring of the outer bearing and the rear end cover segment II, and the outer ring of the outer bearing is limited between the gasket and the brake body;

wherein the brake body is fixed to the rear end cover; the brake body has a circular groove into which the brake pad is fitted; the brake pad has a positioning groove in which the brake block is located; the second bushing further comprises a second bushing segment III, the second bushing segment II is located between the second bushing segment I and the second bushing segment III, and the second bushing segment III is fixed to the brake pad; and the output shaft is rotated to drive the brake block and the brake pad to rotate;

wherein the second bushing segment III has an outer diameter less than that of the second bushing segment II, the brake block is sheathed on the second bushing segment III, and the second bushing segment III is closely fitted with the brake block and connected with the brake block by a key;

wherein the first bushing is fixed to the second bushing via a second fastener; and wherein both an outer edge of the rear end cover segment I and an outer edge of the rear end cover segment II are on an inner side of an outer edge of the rear end cover body; a shield, which is a cylinder with two open ends, is provided on each of an outer side of the rear end cover segment I and an outer side of the rear end cover segment II; a closure plate is fixed at the other end of the shield; and sealant is coated on a contact surface of the closure plate with the shield.

* * * * *